United States Patent [19]

Kao et al.

[11] Patent Number: 4,999,073
[45] Date of Patent: Mar. 12, 1991

[54] HONEYCOMB PLEATER

[76] Inventors: Jamee Kao, 2400 S. Whitehall Dr. #2062, Mundelein, Ill. 60060; Joseph Hsu, 461-35 Chung-Shan N. Rd. Sec. 5, Taipei, Taiwan

[21] Appl. No.: 304,316

[22] Filed: Jan. 31, 1989

Related U.S. Application Data

[63] Continuation-in-part of Ser. No. 24,695, Mar. 11, 1987, Pat. No. 4,795,515.

[51] Int. Cl.⁵ .............................................. B32B 3/12
[52] U.S. Cl. ..................................... 156/197; 156/292; 156/474; 160/84.1; 428/116; 428/181; 428/188
[58] Field of Search ................. 156/197, 292, 474; 160/84.1; 428/116, 181, 188

[56] References Cited

U.S. PATENT DOCUMENTS

| | | | |
|---|---|---|---|
| 3,490,973 | 1/1970 | Graff et al. | 156/292 X |
| 4,450,027 | 5/1984 | Colson | 156/197 X |
| 4,631,217 | 12/1986 | Anderson | 160/84.1 X |
| 4,673,600 | 6/1987 | Anderson | 428/12 |
| 4,676,855 | 6/1987 | Anderson | 156/197 X |
| 4,677,012 | 6/1987 | Anderson | 156/197 X |
| 4,694,144 | 9/1987 | Delaroche et al. | 160/84.1 X |
| 4,732,630 | 3/1988 | Schnebly | 156/197 X |
| 4,795,515 | 1/1989 | Kao et al. | 428/116 X |
| 4,849,039 | 7/1989 | Colson et al. | 428/118 X |
| 4,861,404 | 8/1989 | Neff | 156/292 X |
| 4,871,006 | 10/1989 | Kao et al. | 160/84.1 |

Primary Examiner—Henry F. Epstein

[57] ABSTRACT

A method of forming a honeycomb panel consisting of a plurality of interconnected permanent honeycomb cells that includes in one embodiment feeding two continuous sheets toward a joining station and prior to arrival, periodically creasing both sheets entirely across at timed intervals. After joining the sheets together at the joining station along parallel join lines midway between the creases, the resulting tubular structure is further sealed and expanded with pressure rollers and an expansion chamber to form the completed honeycomb panel. In another embodiment, an uncreased tubular structure is expanded by expansion plates that are inserted into each tube and permanent creases are formed midway between join lines by heating and pressing at the edges of the expansion plates.

12 Claims, 2 Drawing Sheets

4,999,073

HONEYCOMB PLEATER

BACKGROUND OF THE INVENTION

Expandable honeycomb structures have been utilized for many years successfully as window coverings and frequently are constructed of two separate pleated sheets which are secured together with or without joining strips. In other cases a plurality of tues are separately formed and thereafter joined together in serial fashion. An example of one expandable honeycomb structure is shown in the Colson, U.S. Pat. No. 4,603,072. Colson produces his honeycomb structure by feeding one roll of a narrow strip or tape toward a creasing device. Tubular elements are formed by looping the material and the resulting tubular structure is wound in roll-like form on a rotating device.

While the Colson method provides a satisfactory set of honeycomb structures, it is limited in the size of the honeycomb and the height of the stacking and moreover utilizing his method it is difficult to clear extra glue in the middle of the tubular cells because of the cell configuration and also because of winding the completed honeycomb onto a loading roller.

Another disadvantage in the Colson construction is that his method is limited to forming a honeycomb cellular structure of about ¾ inches and therefore it is necessary in order to build cells to join the short cells together axially, or more particularly to stack sets of cells on top of one another.

It is a primary object of the present invention to ameliorate the problems noted above in forming pleated honeycomb panels.

SUMMARY OF THE PRESENT INVENTION

In accordance with the present invention a method is provided for a honeycomb panel consisting of a plurality of permanently increased honeycomb cells that includes in one embodiment feeding two continuous sheets toward a joining station and prior to arrival, periodically creasing both sheets at timed intervals so that the creases on both sheets arrive at the joining station at exactly the same time. At the joining station the sheets are periodically joined together with glue or heat sealing, with or without the addition of an interconnecting sheet, along join lines positioned midway between the creases. The resulting tubular structure is expanded with pressure rollers and an adjacent outlet expansion chamber to form the completed permanent honeycomb panel.

In another embodiment a tubular structure without previous pleating is expanded by expansion plates that are inserted into each tube perpendicular to the structure and with the application of heat and pressure, the plates for the permanent creases that form the permanent honeycomb celled panel.

Toward these ends and in the first embodiment of the present invention the two sheets are fed from feed rolls along flat steel plates toward a joining station. These flat steel plates have transverse recesses that cooperate with a pair of reciprocating creasing points, with or without heat depending upon whether the sheet material is thermoplastic or paper, to form crease lines entirely across each web a regular timed intervals. These intervals are timed so that the creases arrive at the joining station at exactly the same time.

At the joining station the sheets are turned 90 degrees into parallel relation and an interconnecting sheet is applied to one side of each of the webs just prior to turning by heat sealing or glueing. These strips are interconnected along join lines on each of the sheets substantially midway between the creases. It is also within the scope of the present invention that the two sheets be joined directly to one another without the addition of this third interconnecting strip.

A pair of cooperating pressure rollers pulls the resulting tubular structure from the joining station and assists in completing and improving the integrity of the joints.

The pressure rollers feed the tubular structure between a pair of parallel guard plates that form an expansion chamber which is evacuated so that the tubular structure leaving the pressure rollers expands between these plates into the completed honeycomb structure.

In the second embodiment of the present invention a honeycomb structure is formed from a commercially available tubular structure that by itself forms no part of the present invention. This tubular structure consists of a plurality of interconnected rectangular tubes (rectangular in longitudinal section) defined by parallel spaced long side walls having lengths substantially greater than the resulting honeycomb cells, interconnected by short perpendicular end walls. The honeycomb structure is formed from this cellular structure according to this embodiment by inserting expansion plates substantially wider than the spacing between the side walls into each tube serially at the mid-point of the side walls. This expanded tubular structure is heated with the expansion plates in the cells and the walls are pressed there engaged by the plates to permanently form the creases which define the honeycomb cellular structure.

Other objects and advantages of the present invention will appear from the following detailed description.

DETAILED DESCRIPTION OF THE PREFERRED EMBODIMENTS

Figure 1:
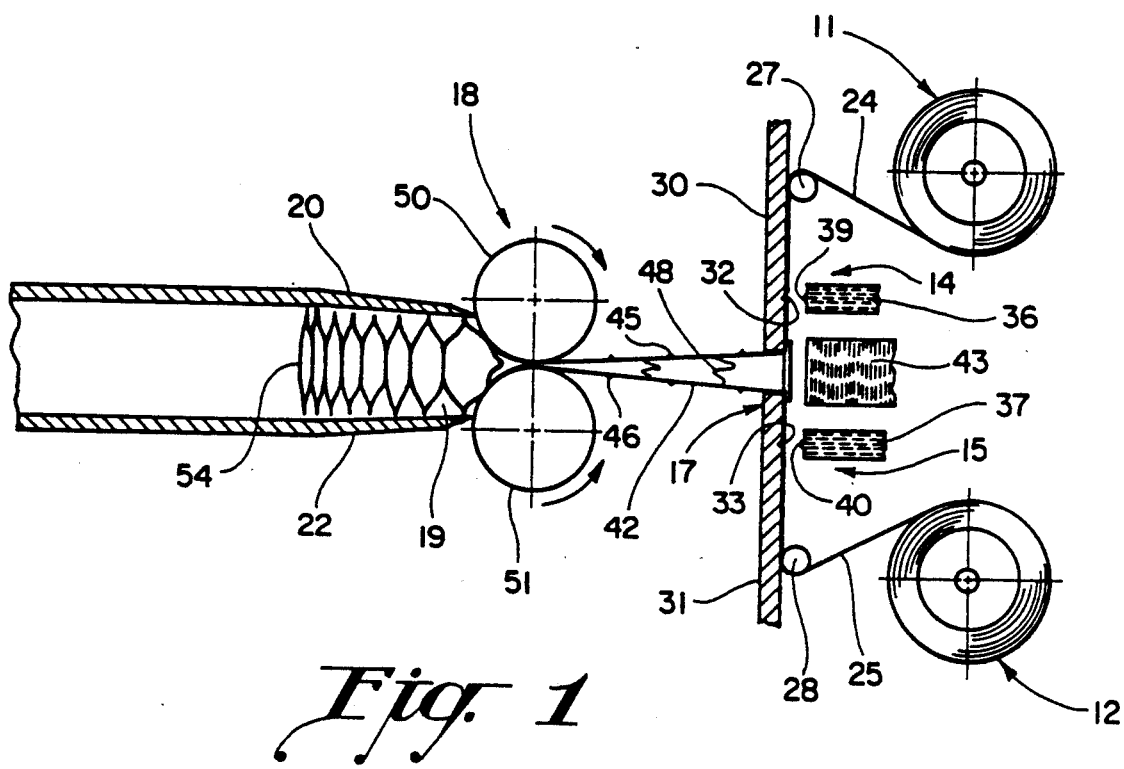
FIG. 1 is a schematic illustration of the first embodiment of the present invention showing a method for forming a completed honeycomb structure utilizing two webs of sheet material, two creasing stations, a joining station, cooperating pressure rollers and an expansion area.

Referring to the drawings and particularly FIG. 1, the first embodiment of the present invention is illustrated consisting generally of web two feed rolls 11 and 12 a pair of creasing stations 14 and 15, a joining station 17, a pair of cooperating pressure rollers 18, and an expansion area 19 defined by guide plates 20 and 22. The feed rollers 11 and 12 feed first and second sheets 24 and 25 of continuous web material, either polyester fabric or paper, to direction changing rollers 27 and 28 that direct each of the sheets on top of steel plates 30 and 31, each of which has a creasing recess 32 and 33 extending in length completely across the sheets 24 and 25 which are of equal width.

The creasing stations 14 and 15 include a pair of reciprocating creasing elements 36 and 37 that have transversely extending sharp points 39 and 40 of equal length to the recesses 32 and 33 that form creases entirely across the sheets 24 and 25 in timed regular fashion so that the creases are equally spaced and arrive at the joining station 17 at exactly the same time. Creasing elements 36 and 37 may be heated depending upon the web material. Plates 30 and 31 are spaced at 42 so that the sheets are turned 90 degrees at the joining station 17 toward the pressure roller assembly 18.

At the joining station 17, one out of a stack of transverse joining tapes 43 is applied serially and joined to the sheets 24 and 25 by heat sealing or glue at points midway between the periodic creases such as in the sheets 24 and 25 as illustrated at 45 and 46. The joined tapes such as illustrated at 48 deform or collapse somewhat as the sheets 24 and 25 are fed generally parallel but somewhat converging toward the pressure roller assembly 18.

The pressure roller assembly 18 includes a pair of large rollers 50 and 51 that squeeze the sheets 24 and 25 together providing increased integrity to the bonds between the interconnecting tapes 48 and the sheets 24 and 25. Moreover the pressure rollers 50 and 51 feed the resulting tubular structure after squeezing into an expansion area defined by the spaced parallel plates 20 and 22, and the area between the plates is evacuated to assist in this expansion process. The result is completed honeycomb structure 54, and in this regard it should be noted that the first structure to be completed by the method according to the FIG. 1 embodiment is the first out of the machine which has significant advantages.

Figure 2:
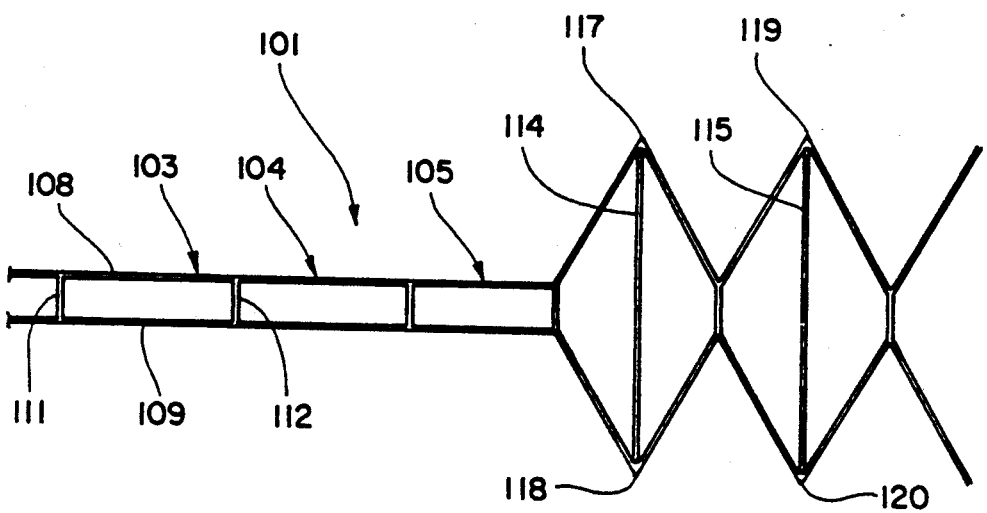
FIG. 2 schematically illustrates a method of forming a permanent honeycomb structure from a commercially available tubular structure utilizing serially inserted expansion plates.

In the embodiment illustrated in FIG. 2, the method begins with a tubular structure 101 that is conventional by itself and produced by conventional processes, and it may be constructed of either polyester fabric or paper, and this structure is seen to include a plurality of interconnected rectangular tubular elements such as illustrated at 103, 104, and 105, each of which includes parallel spaced equal length side walls 108 and 109, each having a length substantially greater than the length of the desired resulting honeycomb cells. These side falls are interconnected by short end walls 111 and 112 that are perpendicular to the side walls 108 and 109, and note that the end walls 111 and 112 are common to adjacent tubular elements 102 103 104 and 105.

According to the method of FIG. 2, flat steel expansion plates 114 and 115 are serially inserted into the tubular elements 103, 104 and 105 at the mid-point of the side walls 108 and 109, expanding the side walls and forming a non-permanent crease at lines 117, 118, 119 and 120. Thereafter heat and pressure is applied at lines 117, 118 119 and 120 in serial fashion to form permanent pleats along these lines and the result is the honeycomb panel 126 illustrated in FIG. 4.

Figure 3:
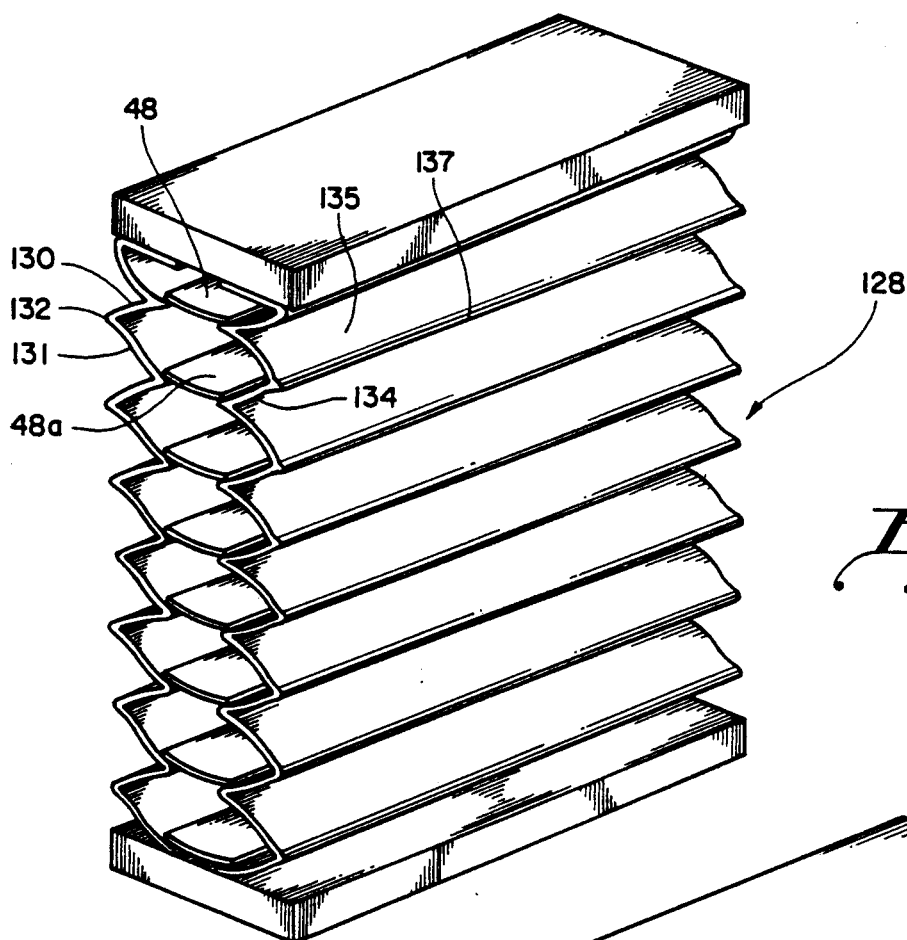
FIG. 3 is a perspective view illustrating a completed honeycomb panel formed according to the method illustrated in FIG. 1.

The honeycomb panel 128 illustrated in FIG. 3, results from the method illustrated in FIG. 1 and each of the honeycomb cells is seen to include a pair of interconnecting tapes 48 and 48a at each end of the cell, side walls 130 and 131 formed from sheet 24, interconnected at crease line 132, formed by creasing assembly 14, and opposite side walls 134 and 135 formed from sheet 25 interconnected by a crease formed by the creasing assembly 15.

Figure 4:
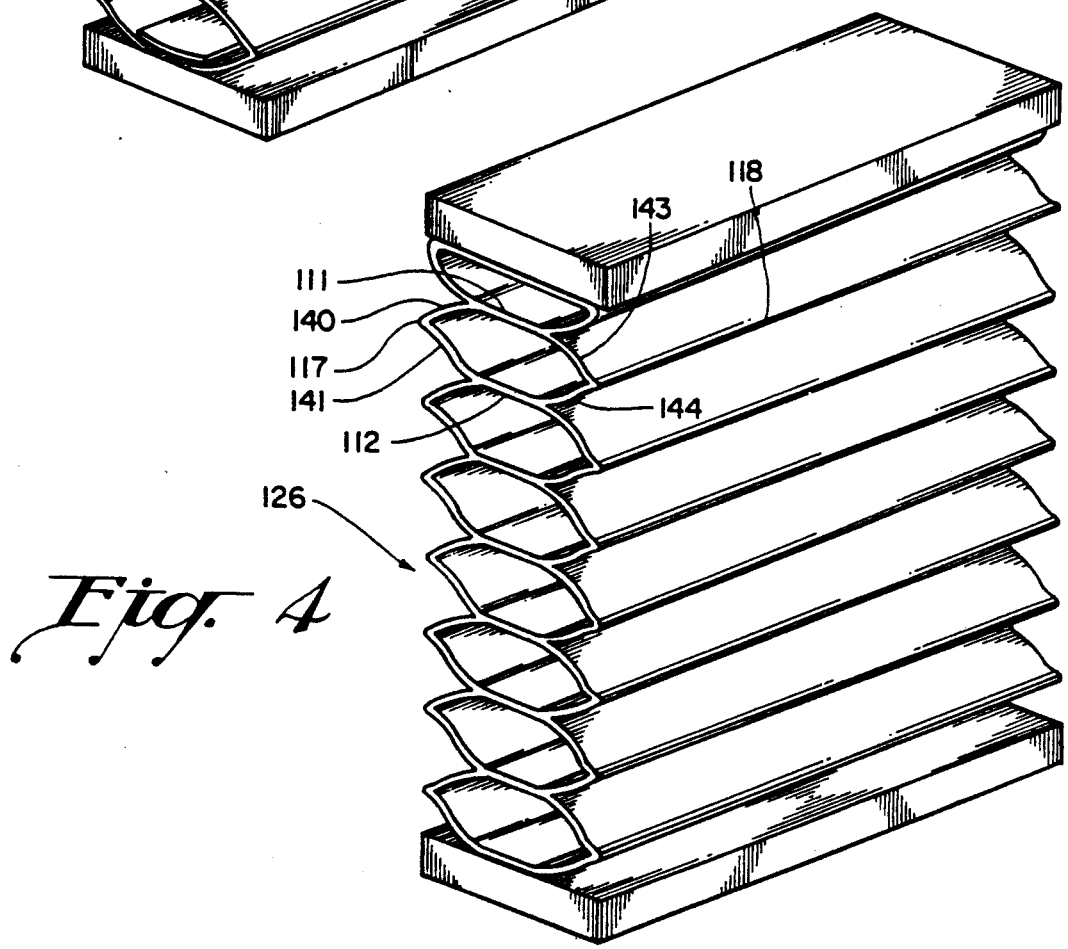
FIG. 4 is a perspective view of a completed honeycomb panel resulting from the method illustrated in FIG. 2.

In the FIG. 4 honeycomb structure 126, each of the cells is formed, for example, by end walls 111 and 112, side walls 140 and 141 formed from single side wall 108 and joined along crease line 117 formed by expansion plate 114. The opposite side walls 143 and 144 are formed from single side wall 109 illustrated in FIG 2 joined at crease line 118 formed by the bottom edge of expansion plate 114 illustrated in FIG. 2.

In both the embodiment illustrated in FIG. 1 and the embodiment illustrated in FIG. 2, the finished product, the honeycomb creased shade, is a first come in-first come out product. Therefore, it is a simple matter to clear the extra glue from the cells or tubes when necessary.

We claim:

1. A method of forming a honeycomb panel consisting of a plurality of interconnected expanded honeycomb cells, including the steps of forming an unpleated tubular structure generally consisting of a plurality of adjacent and connected tubes with each tube including closely spaced parallel unpleated side walls having a length substantially greater than the resulting honeycomb cells, with the side walls being interconnected by relatively short end walls, and pleating the tubes and simultaneously expanding the connected tubes serially by drawing out the side walls in a direction perpendicular to the parallel unpleated side walls at their midpoints away from one another to form a honeycomb panel having a single row of expanded cells one on top of the other.

2. A method of forming a honeycomb panel as defined in claim 1, wherein the step of forming the tubular structure includes separately feeding two continuous sheets of web material toward a joining station, periodically creasing but not pleating each of the sheets prior to the joining station at regular intervals so the creases on the sheets arrive at the joining station at the same time, and joining the sheets together at the joining station along parallel join lines midway between the creases.

3. A method of forming a honeycomb panel as defined in claim 1, wherein the step of expanding the connected tubes includes rotating a pair of opposed pressure rollers on the opposite sides of the tubular structure to assist in assuring complete joining and feeding into an expansion area.

4. A method of forming a honeycomb panel as defined in claim 1, wherein the step of expanding the connected tubes includes feeding the connected tubes into an evacuated chamber.

5. A method of forming a honeycomb panel as defined in claim 1, wherein the step of expanding the connected tubes includes inserting expansion plates serially into the connected tubes with the plates transverse to and perpendicular to the tubular structure.

6. A method of forming a honeycomb panel as defined in claim 5, including the step of heating and pressing the side walls at the point of engagement with the expansion plates to form pleats substantially centrally in the side walls to form the completed permanent honeycomb cells.

7. A method of forming a honeycomb panel consisting of plurality of interconnected permanent honeycomb cells, including the steps of: feeding first and second continuous sheets of web material toward a joining station, prior to arrival at the joining station periodically creasing without pleating both of the sheets along crease lines at regular intervals timed so the creases on both sheets arrive at the joining station at the same time, joining the two sheets at the joining station along join areas substantially midway between the crease lines, and pleating the sheets after joining and simultaneously expanding the sheets by drawing the sheets at the crease lines outwardly in a direction perpendicular to the sheets to form a honeycomb panel having a single row of expanded cells one on top of the other.

8. A method of forming a honeycomb panel as defined in claim 7, wherein the step of expanding the sheets includes rotating a pair of adjacent pressure rollers on opposite sides of the joined sheets and feeding the sheets into an expansion area.

9. A method of forming a honeycomb panel as defined in claim 7, wherein the step of joining the sheets together includes attaching a transverse strip between the first and second sheets.

10. A method of forming a honeycomb panel as defined in claim 8, including feeding the joined sheets into an evacuated chamber.

11. A method of forming a honeycomb panel consisting of a plurality of interconnected permanent honeycomb cells, including the steps of: feeding first and second continuous sheets of web material toward a joining station, prior to arrival at the joining station periodically creasing without pleating both of the sheets along crease lines at regular intervals timed so the creases on both sheets arrive at the joining station at the same time, joining the two sheets at the joining station along join areas substantially midway between the crease lines, and pleating the sheets after joining by drawing the sheets at the crease lines outwardly in a direction perpendicular to the sheets expanding the sheets to form interconnected permanent honeycomb cells, the step of expanding the sheets including rotating a pair of adjacent pressure rollers on opposite sides of the joined sheets and feeding the sheets into an evacuated chamber expansion area to form a honeycomb panel having a single row of expanded cells one on top of the other.

12. A method of forming a honeycomb panel consisting of a plurality of interconnected expanded honeycomb cells, including the steps of forming an unpleated tubular structure generally consisting of a plurality of adjacent and connected tubes with each tube including closely spaced unpleated parallel side walls having a length substantially greater than the resulting honeycomb cells, with the side walls being interconnected by relatively short end walls, and pleating the tubes by expanding the connected tubes serially by drawing out the side walls in a direction perpendicular to the parallel unpleated side walls at their mid-points away from one another to form a plurality of permanent interconnected expanded honeycomb cells, the step of expanding the connected tubes including inserting expansion plates serially into the connected tubes with the plates transverse to and perpendicular to the tubular structure, and the step of expanding the connected tubes including heating and pressing the side walls at the point of engagement with the expansion plates to form pleats substantially centrally in the side walls to form the completed permanent honeycomb cells, to form a honeycomb panel having a single row of expanded cells one on top of the other.

* * * * *